(12) United States Patent
Sato et al.

(10) Patent No.: US 9,410,047 B2
(45) Date of Patent: Aug. 9, 2016

(54) ANTIFOULING ARTICLE AND METHOD FOR PRODUCING SAME

(75) Inventors: Yohei Sato, Matsusaka (JP); Shigeo Hamaguchi, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 198 days.

(21) Appl. No.: 13/979,413

(22) PCT Filed: Jan. 12, 2012

(86) PCT No.: PCT/JP2012/050413
§ 371 (c)(1),
(2), (4) Date: Jul. 12, 2013

(87) PCT Pub. No.: WO2012/096320
PCT Pub. Date: Jul. 19, 2012

(65) Prior Publication Data
US 2013/0303689 A1      Nov. 14, 2013

(30) Foreign Application Priority Data

Jan. 13, 2011   (JP) .................................. 2011-005032
Jan. 5, 2012    (JP) .................................. 2012-000440

(51) Int. Cl.
*C09D 5/16*        (2006.01)
*B08B 17/06*       (2006.01)

(52) U.S. Cl.
CPC .............. *C09D 5/1637* (2013.01); *B08B 17/06* (2013.01)

(58) Field of Classification Search
USPC .......................................... 524/588; 427/387
See application file for complete search history.

(56) References Cited

U.S. PATENT DOCUMENTS

2003/0139620 A1\* 7/2003 Yamaguchi et al. ........... 556/445
2004/0047047 A1\* 3/2004 Yamaguchi ............ G02B 1/105
                                                  359/666

(Continued)

FOREIGN PATENT DOCUMENTS

EP      1 300 433 A2    4/2003
JP      11-92177 A      4/1999

(Continued)

OTHER PUBLICATIONS

Japanese-language Written Opinion dated Apr. 17, 2012 (Four (4) pages).

(Continued)

*Primary Examiner* — Peter D Mulcahy
*Assistant Examiner* — Henry Hu
(74) *Attorney, Agent, or Firm* — Crowell & Moring LLP

(57) ABSTRACT

An antifouling article characterized by having a cured condensed coating film of a perfluoropolyether group-containing silane represented by general formula [1] on the surface of a substrate and by having a fluorine concentration of the cured condensed coating film of 0.2-2.0 μg/cm$^2$.

$$W-(CF_2)_a-(C_mF_{2m}OC_nF_{2n})_b-X-V-(CH_2)_k- \quad [1]$$

$$-[Si(Me)_2OSi(Me)_2]_l-(CH_2)_{e'}-\underset{(CH_2)_e-Si-Z_c}{\overset{Y}{\underset{|}{C}}}-H$$
$$\phantom{-[Si(Me)_2OSi(Me)_2]_l-(CH_2)_{e'}-}\underset{R_{3-c}}{\phantom{|}}\Big]_d$$

2 Claims, 1 Drawing Sheet

APPLICATION (A)       APPLICATION (B)       APPLICATION (C)

(56) References Cited

U.S. PATENT DOCUMENTS

| | | |
|---|---|---|
| 2009/0208728 A1 | 8/2009 | Itami et al. |
| 2009/0299001 A1 * | 12/2009 | Sato ..................... C08G 65/007 524/588 |
| 2010/0036062 A1 * | 2/2010 | Okawa ................... A61K 8/894 525/474 |

FOREIGN PATENT DOCUMENTS

| | | | |
|---|---|---|---|
| JP | 2000-234071 A | | 8/2000 |
| JP | 2000-282009 A | | 10/2000 |
| JP | 2003-238577 A | | 8/2003 |
| JP | 2003/238577 A | * | 8/2003 |
| WO | WO-98/49218 | * | 11/1998 |
| WO | WO 98/49218 A1 | | 11/1998 |
| WO | WO 2012/036053 A1 | | 3/2012 |

OTHER PUBLICATIONS

International Search Report dated Apr. 17, 2012 with English translation (Three (3) pages).

Extended European Search Report issued in counterpart European Application No. EP 12734619.5 dated Jan. 26, 2016 (Six (6) pages).

* cited by examiner

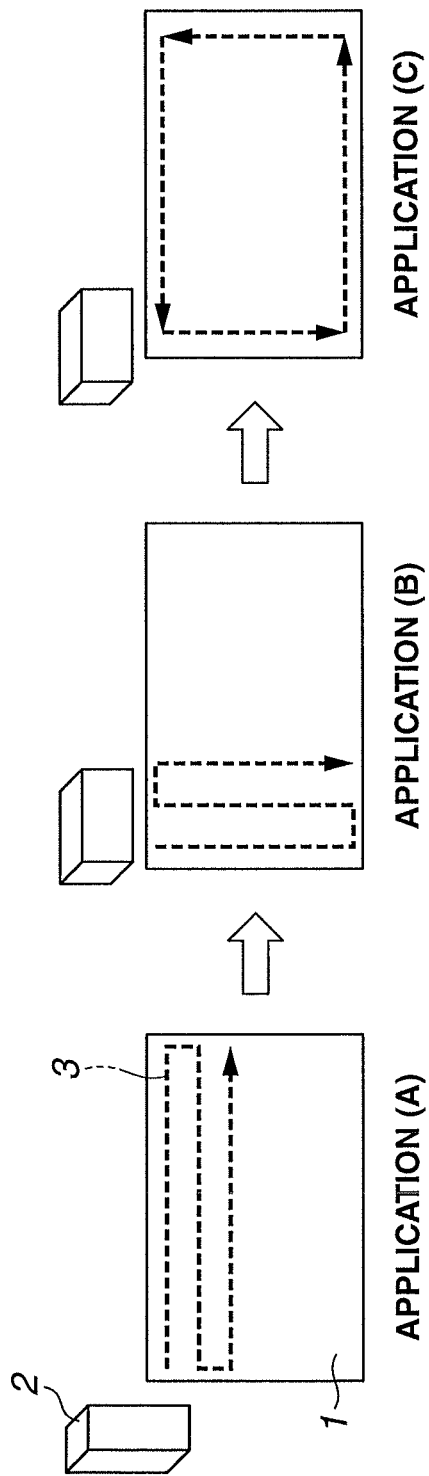

ANTIFOULING ARTICLE AND METHOD FOR PRODUCING SAME

TECHNICAL FIELD

The present invention relates to an article to which pollutants do not easily adhere and which has excellent removal performance of adhering pollutants and to which dust and the like do not easily adhere, and relates to a method for producing the same.

BACKGROUND OF THE INVENTION

Substrates such as metals, glass, plastics, potteries and the like are used as general-purpose substrates for automotive parts, household items, home electric appliances and OA apparatus. The surfaces of these substrates are liable to get stained by the adhesion of waterdrops and water stain due to rain and the like, suspending dust particles, oily matters such as tar of cigarette, fingerprints and sebum of the human hand and the like, and therefore required to have such antifouling functions as to be resistant to these stains and easily remove stains that have once adhered thereto.

In order to exhibit these antifouling functions, a variety of methods have hitherto been proposed. In Patent Publication 1, there is disclosed an antifouling agent composition consisting of a compound having a perfluoroalkylether group. In Patent Publication 2, there is disclosed a glass subjected to a water repellency-imparting treatment and excellent in water repellency, antifouling property and durability, where a treatment film that contains as the primary component an alkoxysilane compound having a perfluoropolyether group is formed on a surface of a substrate. Patent Publication 3 sets forth: a fluorine-containing polymer having a good antifouling property against oily pollutants and particularly having a good antifouling property against fingerprints; and an antifouling substrate on which surface a layer of the polymer is formed. In Patent Publication 4, there are disclosed a silane denatured with a perfluoropolyether group having an excellent in durability, antifouling property imparting effect and particularly having an excellent fingerprint-removability imparting effect and a surface treatment agent containing the same as the primary component.

REFERENCES ABOUT PRIOR ART

Patent Publication
Patent Publication 1: Japanese Patent Application Publication No. 2000-234071
Patent Publication 2: Japanese Patent Application Publication No. 11-092177
Patent Publication 3: International Application Publication No. WO/1998/049218
Patent Publication 4: Japanese Patent Application Publication No. 2003-238577

SUMMARY OF THE INVENTION

Problems to be Solved by the Invention

As have been discussed in the above patent publications, in most of the cases of forming a layer that exhibits the antifouling functions (the layer will hereinafter be referred to as an antifouling layer) on the surface of the substrate, a fluorine-containing compound that is high in water and oil repellency is used as a material constituting the antifouling layer and the antifouling layer is provided with about 0.1 nm to 100 μm thickness.

In fact, when a cured condensed coating film such as the silane denatured with a perfluoropolyether group as discussed in Patent Publication 4 is used as an antifouling layer, an antifouling property is excellently exhibited. However, it is difficult to say that these techniques can sufficiently prevent the adhesion of fine contaminants such as dust and dirt (hereinafter referred to merely as "fine substances") and sufficiently remove adhering fine substances, and additionally, an antifouling property and a dirt removal performance against oily pollutants (i.e., stains due to sebum such as fingerprints, edible oil and cosmetics) are sometimes lowered when the fine substances heavily adhere to the coating film (see the undermentioned Comparative Examples). For example, mirrors, displays and exterior and interior windows may be brought into contact with a great deal of fine substances in a short time according to environments where antifouling articles are used (i.e., an environment where the surface is always exposed to the outside), and the presence of the fine substances have raised a serious problem of reduction of antifouling property.

An object of the present invention is to provide: an antifouling article to which fine substances do not easily adhere and which has excellent removal performance of adhering fine substances while exhibiting good antifouling properties and dirt removal properties even in the cases when fine substances have adhered thereto; and a method for producing the antifouling article.

Means for Solving the Problems

The present inventors have eagerly made studies and resulted in a finding that the above problems can be solved by providing a specified range of fluorine amount (fluorine concentration) per unit area to the cured condensed coating film formed on the surface of the substrate and an excellent antifouling property is obtained thereby.

More specifically, the present invention is an antifouling article characterized by having a cured condensed coating film of a perfluoropolyether group-containing silane represented by general formula [1] on the surface of a substrate and by having a fluorine concentration of the cured condensed coating film of 0.2-2.0 μg/cm².

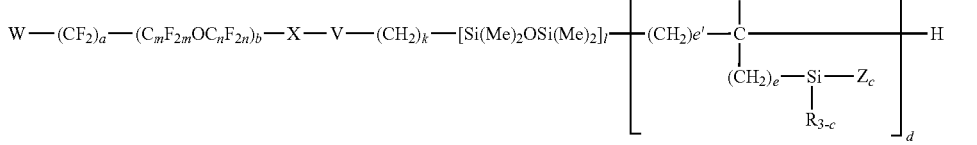

[In the formula, "W" represents a fluorine atom or a substituent represented by the following structural formula:

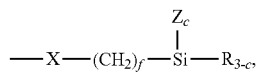

"X" represents a group represented by a formula $-(O)_g-(CF_2)_h-(CH_2)_i-(OC_2F_4)_j-$ (in this formula, "g", "h", "i" and "j" mutually independently represent an integer of 0 to 50, the total of "g" and "h" is not smaller than 1, and the order of the positions of the parenthesized repeating units is arbitrary), "Y" represents a hydrogen atom or a $C_1$-$C_5$ lower alkyl group, "Z" represents at least one hydrolyzable functional group selected from the group consisting of alkoxyl groups such as methoxy group, ethoxy group, propoxy group, isopropoxy group, butoxy group and the like, chloro group, amino group and isocyanate group, "R" represents a $C_1$-$C_{10}$ alkyl group, and "V" represents an oxygen atom or a divalent organic group. "a" is an integer of 0 to 50, "b" is an integer of 1 to 200, "c" is an integer of 1 to 3, "d" is an integer of 1 to 10, "e" is an integer of 0 to 4, "e'" is an integer of 0 or 1, "f" is an integer of 0 to 5, "k" is an integer of 0 to 5, "l" is an integer of 0 or 1, "m" and "n" mutually independently represent an integer of 0 to 50, and the total of "m" and "n" is not smaller than 1.]

Furthermore, the present invention is a method for producing the above-mentioned antifouling article, characterized by including:

(1) a step which includes an application (A) where a perfluoropolyether group-containing silane represented by general formula [1] is diluted with a solvent to obtain a coating agent, the coating agent is retained in a member and then the member is brought into contact with a surface of a substrate and reciprocated on the surface of the substrate in an arbitrary one direction to apply the coating agent to the whole surface and a subsequent application (B) where the member is brought into contact with the surface of the substrate again and reciprocated on the surface of the substrate in one direction different from the application direction of the application (A) to stabilize the coating agent on the whole surface; and (2) a step of drying the applied coating agent.

Effects of the Invention

The antifouling article according to the present invention has good antifouling properties and dirt removal properties, and exhibits the good antifouling properties even in an interior or exterior environment ordinarily including a great deal of fine substances such as dust and dirt.

BRIEF DESCRIPTION OF THE DRAWINGS

FIG. 1 is a schematic view showing one example of preferable methods of applying a coating film for forming an antifouling layer of the present invention.

MODE(S) FOR CARRYING OUT THE INVENTION

The present invention is an antifouling article characterized by having a cured condensed coating film of a perfluoropolyether group-containing silane represented by general formula [1] on the surface of a substrate and by having a fluorine concentration of the cured condensed coating film of 0.2-2.0 μg/cm².

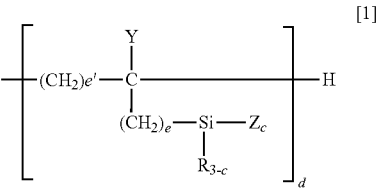

[1]

First of all, a substrate for an antifouling article of the present invention will be discussed. The substrate of the present invention is not particularly limited; for example, it is possible to employ a float sheet glass used for architectural windows or a transparent inorganic sheet glass such as soda-lime glass produced by roll forming method.

By using these sheet glasses, it is possible to form glass windows such as display, touchscreen and showcase, glass materials for a front glass of a game machine (i.e., a Pachinko game stand), reflecting substrates such as a mirror, and translucent or opaque glass substrates such as ground glass and pattern-inscribed glass.

As a substrate for the present invention other than the above-mentioned glass substrates, it is also possible to employ substrates formed of ceramic material used for tiles, roofing tiles, sanitary potteries, eating utensils and the like, frame members for glass window, cookwares, medical instruments such as scalpels and needles, stainless steel used for sink, automotive bodies and the like, metal materials such as aluminum and steel, plastic substrates such as polycarbonate resin, polyethylene terephthalate resin, polymethyl methacrylate resin, polyethylene resin and polyvinyl chloride resin and other plastic substrates.

It is possible to use various shapes of substrates, such as flat plate and curved plate. The size and the thickness are not particularly limited. The cured condensed coating film that the substrate has on its surface may be formed entirely or partially on the surface.

Then, a perfluoropolyether group-containing silane represented by general formula [1] will be discussed.

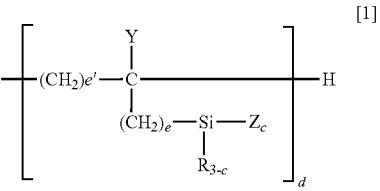

[1]

[In the formula, "W" represents a fluorine atom or a substituent represented by the following structural formula:

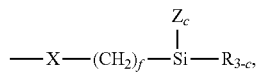

"X" represents a group represented by a formula $-(O)_g-(CF_2)_h-(CH_2)_i-(OC_2F_4)_j-$ (in this formula, "g", "h", "i" and "j" mutually independently represent an integer of 0 to 50, the total of "g" and "h" is not smaller than 1, and the order of the positions of the parenthesized repeating units is arbitrary), "Y" represents a hydrogen atom or a $C_1$-$C_5$ lower alkyl group, "Z" represents at least one hydrolyzable functional group selected from the group consisting of alkoxyl groups such as methoxy group, ethoxy group, propoxy group, isopropoxy group, butoxy group and the like, chloro group, amino group and isocyanate group, "R" represents a $C_1$-$C_{10}$ alkyl group, and "V" represents an oxygen atom or a divalent organic group. "a" is an integer of 0 to 50, "b" is an integer of 1 to 200, "c" is an integer of 1 to 3, "d" is an integer of 1 to 10, "e" is an integer of 0 to 4, "e'" is an integer of 0 or 1, "f" is an integer of 0 to 5, "k" is an integer of 0 to 5, "l" is an integer of 0 or 1, "m" and "n" mutually independently represent an integer of 0 to 50, and the total of "m" and "n" is not smaller than 1.]

By the presence of moieties represented by $-[CF_2]_a-$, $-[C_mF_{2m}OC_nF_{2n}]_b-$, $[-(O)_g-(CF_2)_h-(CH_2)_i-]$, $-[CH_2]_e-$, $-[CH_2]_f-$, $-(OC_2F_4)_j-$ and $-[CH_2]_k-$ in general formula [1], it becomes possible to impart good antifouling performance and wear resistance to the obtained cured condensed coating film. Accordingly, a cured condensed coating film formed by condensing the above-mentioned perfluoropolyether group-containing silane excellently gains both antifouling performance and wear resistance and therefore preferable.

In the general formula [1], when the repeating structure is a perfluoroalkyl group having a carbon number of not smaller than 2, it can take either a straight-chained or branched structure. For example, a structure of $-[C_mF_{2m}OC_nF_{2n}]_b-$ may take a branched structure of $-[OCF(CF_3)]_b-$ if "m" is 0 and "n" is 2.

"V" in the general formula [1] represents an oxygen atom or a divalent organic group. As an organic group, it is possible to cite amide, N-methylamide, N-ethylamide, ester and ether, for example. Of these, oxygen atom and amide are preferable.

A cured condensed coating film that the antifouling article of the present invention has at the surface of a substrate is produced on the surface of the substrate in such a manner that a bond (for example, metalloxane bond represented by siloxane bond and the like) or an interaction (for example, Van der Waals force, a static interaction and the like) is caused between a functional group of a perfluoropolyether group-containing silane represented by the general formula [1] or a silanol group obtained such that the hydrolyzable functional group is hydrolyzed and an active species of the surface of the substrate. The adhesiveness between the coating film and the surface of the substrate differs according to substrates to be used and reactivity of the functional group, so that it is preferable to properly make examinations.

Additionally, when the reactivity of a hydrolyzable functional group represented by "Z" in the general formula [1] is too high, not only the coating agent becomes difficult to handle at the time of being prepared but also the pot life of the coating agent becomes shortened (specifically discussed below). On the contrary, an excessively low reactivity cannot sufficiently develop the hydrolysis reaction so that the amount of the formed silanol group becomes insufficient. With this, the bond or interaction caused between the silanol group and the active species of the surface of the substrate is not enough and therefore an adequate adhesiveness may not be imparted between the coating film and the surface of the substrate and the durability of the coating film may sometimes be reduced. In view of the above, the hydrolyzable functional group represented by "Z" is preferably at least one selected from the group consisting of alkoxyl groups such as methoxy group, ethoxy group, propoxy group, isopropoxy group, butoxy group and the like, chloro group and isocyanate group. Of these, the hydrolyzable functional group is preferably an alkoxyl group and more particularly methoxy group or ethoxy group, with consideration given to ease of handling the hydrolyzable functional group, the pot life of the coating agent and the durability of the obtained cured condensed coating film.

A perfluoropolyether group-containing silane represented by the general formula [1] is considered to establish a Si—O— bond between it and the surface of the substrate through hydrolysis of a functional group represented by "Z" of a Si—Z moiety. The number of moles of fluorine in the perfluoropolyether group-containing silane of around 20 to 200 relative to 1 mol of silicon contained in a bondable moiety (a Si group-containing moiety) in the perfluoropolyether group-containing silane is preferable because an excellent water repellent performance can be imparted to the substrate.

Of perfluoropolyether group-containing silanes represented by the general formula [1], a perfluoropolyether group-containing silane having a structure represented by the following general formula [2], general formula [3] or general formula [4] is a preferable compound.

[2]

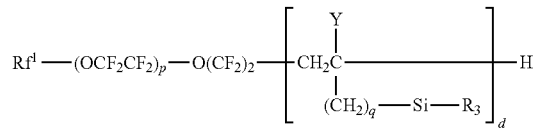

[In the formula, "Rf¹" represents a $C_1$-$C_{100}$ straight-chained perfluoroalkyl group. "p" represents an integer of 1 to 100 and "q" represents an integer of 0 to 2. "Y", "R" and "d" are the same as in the general formula [1].]

[3]

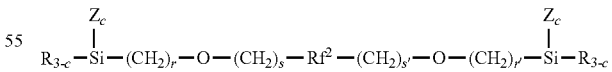

[In the formula, "Rf²" represents a divalent group including an unit represented by a formula $-(C_tF_{2t}O)-$ (where "t" is an integer of 1 to 6) and having a straight-chained perfluoroalkyleneether structure with no branch or represents a perfluoroalkyl structure including an unit represented by $-C_uF_{2u}-$ (where "u" is an integer of 1 to 8). Each of "r" and "r'" represents an integer of 1 to 5. Each of "s" and "s'" represents an integer of 0 to 2. "R", "Z" and "c" are the same as in the general formula [1].]

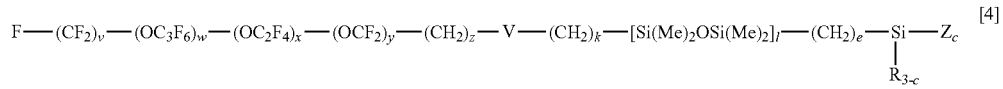

[In the formula, "V" represents an integer of 0 to 3 and each of "w", "x", "y" and "z" represents an integer of 0 to 50. "R", "V", "Z", "c", "k", "l" and "e" are the same as in the general formula [1].]

As commercially available products containing the above compounds, it is possible to cite: OPTOOL DSX and OPTOOL AES series such as OPTOOL AES4 available from DAIKIN INDUSTRIES, LTD; KY130 and KY108 available from Shin-Etsu Chemical Co., Ltd.; Fluoro Surf FG-5020 available from Fluoro Technology; Dow 2634 Coating available from Dow Corning Toray Co., Ltd.; and the like. In the case of preparing the coating agent of the present invention by using the above-mentioned commercially available products, a solvent contained in the commercially available products serves as a part of a solvent to be used for preparing the coating agent of the present invention.

The antifouling article of the present invention is characterized by the amount of fluorine per unit area (the "amount of fluorine" will hereinafter be referred to as merely "a fluorine concentration"). The fluorine concentration in the present invention is obtained by the following method.

(1) By using a X-ray fluorescence analyzer ZSX PrimusII (manufactured by Rigaku Corporation), a calibration curve was calculated from the standard sample of known concentration. (2) Calibration curves of two arbitrary points of cured condensed coating film sample were measured thereby each fluorine concentration of them was calculated. (3) The average value of the two calculated value was defined as the fluorine concentration of the antifouling article.

It is important for the antifouling article of the present invention that the fluorine concentration is 0.2 to 2.0 µg/cm². If the fluorine concentration is lower than 0.2 µg/cm², a sufficient antifouling property cannot be obtained. On the contrary, if the fluorine concentration is larger than 2.0 µg/cm², the fine substances easily adhere to the surface and removal performance of adhering fine substances is reduced. The antifouling article preferably has a fluorine concentration of 0.3 to 1.8 µg/cm², particularly preferably 0.4 to 1.7 µg/cm². If variations in fluorine concentration of arbitrary portions of the antifouling article become smaller, unevenness of the antifouling effect becomes more dissolved; therefore this is preferable since the appearance is not impaired.

Furthermore, the present invention is a method for producing the antifouling article, characterized by including:

(1) a step which includes an application (A) where a perfluoropolyether group-containing silane represented by general formula [1] is diluted with a solvent to obtain a coating agent, the coating agent is retained in a member and then the member is brought into contact with a surface of a Substrate and reciprocated on the surface of the substrate in an arbitrary one direction to apply the coating agent to the whole surface and a subsequent application (B) where the member is brought into contact with the surface of the substrate again and reciprocated on the surface of the substrate in one direction different from the application direction of the application (A) to stabilize the coating agent on the whole surface; and (2) a step of drying the applied coating agent.

This production method will be discussed below.

A coating agent used for producing the antifouling article (the agent may hereinafter be referred to as "a cured condensed coating film-forming coating agent", "a coating film-forming coating agent" or merely "a coating agent") will now be discussed. The coating agent is required only to be one that contains a perfluoropolyether group-containing silane represented by general formula [1] and one that can be evenly applied to a surface of a substrate. However, for ease of application, it is usually preferable to use one diluted with an organic solvent which can dissolve the perfluoropolyether group-containing silane therein. The organic solvent preferably contains 60 to 100 mass % of a fluorine-based solvent. A concentration of the fluorine-based solvent in the organic solvent of lower than 60 mass % is not preferable because the perfluoropolyether group-containing silane cannot sufficiently be dissolved or a coating unevenness occurs. Moreover, in the case where application is continuously conducted in the open system on a great many substrates, the cured condensed coating film becomes easily affected by concentration variations of the perfluoropolyether group-containing silane contained in the coating agent with evaporation of the organic solvent and therefore the appearance and the antifouling property of the cured condensed coating film tend not to be stabilized according to substrates. The fluorine-based solvent contained in the organic solvent preferably has a concentration of 70 to 100 mass %, more preferably 80 to 100 mass %.

The organic solvent contained in the coating agent preferably has a surface tension of not higher than 20.0 mN/m. If the organic solvent is one having a surface tension of higher than 20.0 mN/m, a condition where a puddle portion and the other portion are mixed tends to occur at the time of applying the coating agent to a substrate, because of an aggregating action of the coating agent. It is possible to obtain a visually even cured condensed coating film by wiping the surface of the cured condensed coating film produced after drying so as to remove an excess coating agent; however, when the surface of the cured condensed coating film is exposed to a steam such as water vapor, a portion that had been the puddle portion at one time is selectively subjected to the adhesion of liquid drops and therefore whitish dots easily appear on the surface of the cured condensed coating film, which is not preferable. The more preferable solvent is a solvent having a surface tension of not higher than 19.5 mN/m and more preferably a solvent having a surface tension of not higher than 19.3 mN/m. Incidentally, the surface tension of liquid can be measured by Wilhelmy plate method, for example.

Moreover, the boiling point of the organic solvent is not particularly limited but usually preferably 50 to 250° C. from the viewpoint of ease of operation. An organic solvent having a boiling point of lower than 50° C. is too high in a velocity at which the applied coating liquid reaches dryness so as to tend to cause a coating unevenness. Additionally, the organic solvent contained in the coating agent may be volatilized at some midpoint of application, so that the coating agent cannot be completely spread over the surface of the substrate. Furthermore, in the case where application is continuously conducted in the open system on a great many substrates, the concentration of the perfluoropolyether group-containing silane in the coating agent becomes higher with evaporation of the organic solvent, so that the appearance and the antifouling property of the cured condensed coating film tend not to be stabilized according to substrates. An organic solvent having a boiling point exceeding 250° C. requires a higher temperature or a longer period of time for drying the coating agent, which tends to increase disadvantages in terms of cost. The boiling point of the organic solvent is preferably 60 to 220° C., particularly preferably 70 to 200° C.

The fluorine-based solvent is preferably at least one kind selected from the group consisting of hydrofluorocarbons, perluorocarbons, perfluoroethers, hydrofluoroethers and hydrochlorofluorocarbons. Considering an adequate surface tension and an adequate boiling point, more preferable examples are perfluorocarbons and hydrofluoroethers. In view of environmental burden, the fluorine-based solvent is particularly preferably a hydrofluoroether having a smaller global warming potential.

A preferable example in the case of using of the organic solvent as one kind of organic solvent is as follows. For example, it is possible to use a perfluorocarbon such as perfluorononane, perfluorodecane, a fluorine-based inert liquid (e.g. "Fluorinert FC40", "Fluorinert FC43" and "Fluorinert FC3283" available from Sumitomo 3M Limited) and the like, and a hydrofluoroether such as 1,1,1,2,3,3-hexafluoro-4-(1,1,2,3,3,3-hexafluoropropoxy)-pentane ("Novec 7600" available from Sumitomo 3M Limited) and the like. It is also possible to use two or more kinds of organic solvents as the above-mentioned organic solvent, in which the surface tension of the organic solvent after mixing is preferably not larger than 20.0 mN/m and the boiling point of the same is preferably 50 to 200° C. A mixture liquid of the above-mentioned fluorine-based solvent may be employed. Additionally, it is possible to use a mixture liquid obtained by mixing: hydrofluorocarbons such as 1,1,2,2,3,3,4,4-octafluorobutane, 1,3-bis(trifluoromethyl)benzene, heptafluorocyclopentane ("ZEORORA-H" available from ZEON CORPORATION), 2H,3H-decafluoropentane ("Vertrel XF" available from Mitsui DuPont Fluorochemical), 1,1,1,3,3,3-hexafluoroisopropanol and the like; perluorocarbons including perfluoroalkanes represented by $C_nF_{2n+2}$, such as perfluorohexane, perfluoroheptane and perfluorooctane ("Fluorinert PF5060", "Fluorinert PF5070" and "Fluorinert PF5080", respectively, available from Sumitomo 3M Limited), hexafluorobenzene, perfluoro-1,3-dimethylcyclohexane, a fluorine-based inert liquid (such as "Fluorinert FC" series) and the like; perfluoroethers such as perfluoro(2-butyltetrahydrofuran) and the like; hydrofluoroethers such as methylperfluorobutylether ("Novec 7100" available from Sumitomo 3M Limited), nonafluorobutylethylether ("Novec 7200" available from Sumitomo 3M Limited), methylperfluorohexylether ("Novec 7300" available from Sumitomo 3M Limited) and the like; hydrochlorofluorocarbons such as 1,2-dichloro-3,3,3-trifluoropropene, 1-chloro-3,3,3-trifluoropropene, 3,3-dichloro-1,1,1,2,2-pentafluoropropane ("HCFC-225" available from ASAHI GLASS CO., LTD.) and the like; and hydrocarbon-based solvents such as butane, hexane, 2-methylpentane, 2,2-dimethylbutane, 2,3-dimethylbutane, 2-methylhexane and the like with the above-mentioned fluorine-based solvent and a mixture liquid thereof.

The concentration of the perfluoropolyether group-containing silane in the coating agent is preferably 0.01 to 5 mass %. A concentration of less than 0.01 mass % is not preferable because the antifouling property on the surface of the substrate may not sufficiently be exhibited and the cured condensed coating film is formed unevenly. A concentration of more than 5 mass % is also not preferable because an excess portion of the cured condensed coating film becomes difficult to be removed and the amount of the excess portion becomes so increased as to result in an additional cost. Furthermore, such concentrations make the adhesion of the fine substances easily occur and reduce the removal performance of adhering fine substances, and therefore not preferable. From the viewpoint of the antifouling property, an ability to remove the excess portion and cost, a more preferable concentration range is 0.05 to 1 mass % and a much more preferable concentration range is 0.1 to 0.4 mass %.

Additionally, the cured condensed coating film-forming coating agent may contain a compound formed in such a manner that a hydrolyzable functional group of a perfluoropolyether group-containing silane represented by the general formula [1] causes a partial hydrolysis or condensation reaction in a molecule or between molecules, in addition to the perfluoropolyether group-containing silane.

Additionally, the cured condensed coating film-forming coating agent may contain a catalyst for the purpose of accelerating the hydrolysis or condensation reaction of the perfluoropolyether group-containing silane represented by the general formula [1]. The catalyst is exemplified by organic tin compounds such as dibutyltin methoxide and dibutyltindilaurate, organic titanium compounds such as tetra-n-butyl titanate, organic acids such as acetic acid, methanesulfonic acid and trifluoroacetic acid, inorganic acids such as hydrochloric acid and sulfuric acid and the like. In particular, acetic acid, tetra-n-butyl titanate, dibutyltindilaurate and the like are preferable. The adding amount is preferably a usual catalyst amount.

Additionally, to the cured condensed coating film-forming coating agent, there may be added a surfactant, a cross-linking agent, an antioxidant, a UV absorber, an IR absorber, a flame retardant, a hydrolysis inhibitor, an antifungal agent or the like within a range not to affect the scope of the present invention.

In order to further improve the durability of the antifouling article, it is also possible to previously conduct a treatment on the surface of the substrate, the treatment for improving the adhesive strength between the substrate and the cured condensed coating film. The treatment is exemplified by treatments for generating active groups on the surface of the substrate, such as polishing, rinsing and drying with the use of various polishing liquids, a surface reforming treatment using an acid or basic solution, a primer treatment, plasma radiation, corona discharge, high-pressure mercury lamp irradiation and the like. The active species and a hydrolyzable functional group represented by "Z" in the general formula [1] or a silanol group obtained such that the hydrolyzable functional group is hydrolyzed cause a bond (for example, metalloxane bond represented by siloxane bond and the like) or interaction (for example, Van der Waals force, a static interaction and the like) therebetween, thereby allowing imparting a sufficient adhesiveness between the cured condensed coating film and the surface of the substrate.

As a method for applying the cured condensed coating film-forming coating agent to the surface of the substrate, it is possible to employ various application methods such as brush application, human hand coating, robot application and any combination of these. Incidentally, application can be performed by fixing a member for retaining the coating agent so as to bring the member into contact with the surface of the substrate and then by moving the substrate. Brush application, hand coating and robot application are preferable because these methods do not so limit the form or size of the substrate to be subjected to application and therefore various kinds of substrates are usable. In particular, hand coating is more preferable.

The member for retaining the coating agent is exemplified by nonwoven fabrics of which raw material is pulp, acrylic fiber, PET, PP, nylon, rayon or the like. In particular, a composite material of PP and pulp is preferable from the viewpoint of strength and absorbency.

Then, there will hereinafter be discussed steps (1) and (2), characteristics of the production method of the present invention.

In a first step (1) for applying the coating agent to a surface of a substrate, an application (A) is conducted thereby spreading the coating agent all over the surface of the substrate. Then an application (B) is conducted thereby leveling the surface of a coating layer evenly. A reciprocating direction of the member in the application (B) is not particularly limited, but preferably one that forms an angle θ between the reciprocating direction of the member in the application (A) and the reciprocating direction of the member in the application (B) of 20 to 160° since the coating agent can be more evenly applied. A more preferable direction is one that forms an angle of 45 to 135°. An article obtained by such an application method exhibit a preferable range of fluorine concentration. Furthermore, by performing an application (C), it becomes possible to reliably apply the coating agent to an edge portion that tends to undergo a lack of application or a shortage of the coating agent.

A step (2) to be performed after applying the coating agent to the substrate is a step for drying the coating agent, and concurrently it serves as a step for accelerating condensation of the perfluoropolyether group-containing silane so as to form a cured condensed coating film while causing a bond or interaction between a silanol group formed from the perfluoropolyether group-containing silane and an active species of the surface of the substrate to impart a sufficient adhesiveness between the cured condensed coating film and the surface of the substrate. This drying step is preferably conducted at 50 to 250° C., more preferably 100 to 200° C., and it may be performed under any of atmospheric pressure, applied pressure and reduced pressure or in an inert atmosphere. Additionally, heating with microwave is effective too.

In the case where the cured condensed coating film obtained after the drying step has an excess portion on its surface, the excess portion is wiped and removed. When being wiped with a paper towel or cloth moistened with an organic solvent and/or a dried paper towel or cloth, the cured condensed coating film is obtained to have an even surface. It is particularly preferable to wipe the excess portion with disposable papers such as paper towel and tissue paper.

EXAMPLES

Hereinafter the present invention will specifically be explained with reference to examples; however, the present invention is not limited by these examples.

In Examples and Comparative Examples, an antifouling layer-forming coating agent was prepared and then applied onto a substrate thereby producing an antifouling article. A method for preparing a coating agent and a method for producing the antifouling article are as discussed below. Additionally, by applying the following methods, there were conducted quality evaluations in terms of surface tension of an organic solvent used for the coating agent and an antifouling layer of the obtained antifouling article.

[Dust Adhesion]

Bemcot M-1 (a wiper for an industrial use, available from Asahi Kasei Corporation) to which dust adhered in an amount of 20 mg was brought into contact with 100 cm$^2$ of a surface of a sample (100 cm$^2$) and then the appearance of the surface of the sample was visually inspected thereby evaluating the sample by the following criteria.

A: Area of surface of sample covered with dust is smaller than 5%

B: Area of surface of sample covered with dust is 5 to 20%

C: Area of surface of sample covered with dust is larger than 20%

[Dust Removal Performance]

Dust in an amount of 10 mg was adhered to 100 cm$^2$ of a surface of a sample and then wiped with Bemcot M-1. The number of wipes was measured until the dust was completely removed.

A: 1 wipe
B: 2 wipes
C: 3 or more wipes

[Oil Removal Performance under Condition of Dust Adhering]

Dust in an amount of 10 mg was adhered to 100 cm$^2$ of a surface of a sample and 30 mg of oil (a salad oil available from The Nisshin OilliO Group, Ltd.) was dropped thereon, followed by wiping it with Bemcot M-1. The number of wipes was measured until the dust was completely removed.

A: 10 or less wipes
B: 10-40 wipes
C: 40 or more wipes

[Fluorine Concentration]

The fluorine concentration was measured by using a X-ray fluorescence analyzer ZSX PrimusII (manufactured by Rigaku Corporation). The fluorine concentration was obtained by the following method.

(1) By using a X-ray fluorescence analyzer ZSX PrimusII (manufactured by Rigaku Corporation), a calibration curve was calculated from the standard sample of known concentration. (2) Calibration curves of two arbitrary points of the sample were measured thereby each fluorine concentration of them was calculated. (3) The average value of the two calculated value was defined as the fluorine concentration of the antifouling article.

Example 1

(I) Preparation of Cured Condensed Coating Film-Forming Coating Agent

In 50.0 g of Novec 7600 (1,1,1,2,3,3-hexafluoro-4-(1,1,2,3,3,3-hexafluoropropoxy)pentane available from Sumitomo 3M Limited) having a surface tension of 17.7 mN/m and a boiling point of 131° C., 0.75 g of OPTOOL DSX (available from DAIKIN INDUSTRIES, LTD) (a perfluorohexane solution of a perfluoropolyether group-containing silane, having a solid content of 20 mass % and having a probable structure of general formula [2]) was dissolved, followed by stirring for 30 minutes at room temperature, thereby obtaining a coating agent having a concentration of the perfluoropolyether group-containing silane of 0.3 mass %.

(II) Preparation of Substrate (Glass Substrate)

A surface of a float glass substrate having a size of 200 mm*200 mm*2 mm thickness was polished by using a polishing liquid and then rinsed with water and dried. Incidentally, a 2 mass % ceria slurry obtained by mixing a glass polishing agent MIREK A (T) (available from MITSUI MINING & SMELTING CO., LTD.) with water was used as the polishing liquid.

(III) Formation of Cured Condensed Coating Film

As an application (A), a cotton cloth (a trade name of Bemcot M-1) impregnated with 4.0 ml of the coating agent that had been prepared according to the above section (I) was brought into contact with the glass substrate and then reciprocated in an arbitrary one direction as shown in FIG. 1 (i.e., the lateral direction of FIG. 1) so as to apply the coating agent to the whole surface. As a subsequent application (B), the cloth was reciprocated in a direction that forms an angle of about 90° to the application direction of the application (A) (i.e., the vertical direction of FIG. 1) so as to apply the coating agent to the whole surface. As a final application (C), the coating agent was applied along an edge portion of the substrate (indicated in Table 1 by "preferable hand coating (90°)"), followed by bringing the glass substrate into an electric furnace to dry it for 12 minutes. At this time, the maximum attained temperature (or drying temperature) of the glass was 150° C. Finally, an unevenly remaining whitish excess portion which confirmed by visual inspection was wiped away by using a paper towel moistened with NEOCOL CP, thereby obtaining a sample that had a visually transparent cured condensed coating film having an even surface. The thus obtained antifouling article was rated "A" on the criterion for dust adhesion, "A" on the criterion for dust removal performance and "A" on the criterion for oil removal performance. Moreover, the fluorine concentration was 0.93 µg/cm$^2$. The results are shown in Table 1.

Example 2

The procedure of Example 1 was repeated with the exception that the reciprocation of the application (B) in FIG. 1 was conducted in a direction forming an angle of about 60° to the application direction of the application (A) to apply the coating agent the whole surface, thereby obtaining a sample having a cured condensed coating film.

The thus obtained antifouling article was rated "A" on the criterion for dust adhesion, "A" on the criterion for dust removal performance and "A" on the criterion for oil removal performance.

Additionally, the fluorine concentration was 0.94 µg/cm$^2$. The results are shown in Table 1.

Example 3

The procedure of Example 1 was repeated with the exception that the reciprocation of the application (B) in FIG. 1 was conducted in a direction forming an angle of about 45° to the application direction of the application (A) to apply the coating agent the whole surface, thereby obtaining a sample having a cured condensed coating film.

The thus obtained antifouling article was rated "A" on the criterion for dust adhesion, "A" on the criterion for dust removal performance and "A" on the criterion for oil removal performance.

Additionally, the fluorine concentration was 0.90 µg/cm$^2$. The results are shown in Table 1.

Example 4

The procedure of Example 1 was repeated with the exception that the perfluoropolyether group-containing silane had a concentration of 0.2 wt %, thereby obtaining a sample having a cured condensed coating film. The thus obtained antifouling article was rated "A" on the criterion for dust adhesion, "A" on the criterion for dust removal performance and "A" on the criterion for oil removal performance. Additionally, the fluorine concentration was 0.85 µg/cm$^2$. The results are shown in Table 1.

Example 5

The procedure of Example 1 was repeated with the exception that the perfluoropolyether group-containing silane had a concentration of 0.05 wt %, thereby obtaining a sample having a cured condensed coating film. The thus obtained antifouling article was rated "A" on the criterion for dust adhesion, "A" on the criterion for dust removal performance and "A" on the criterion for oil removal performance. Additionally, the fluorine concentration was 0.70 µg/cm$^2$. The results are shown in Table 1.

Example 6

The procedure of Example 1 was repeated with the exception that KY130 was used as the perfluoropolyether group-containing silane, thereby obtaining a sample. The cured condensed coating film of the thus obtained antifouling article was rated "A" on the criterion for dust adhesion, "A" on the criterion for dust removal performance and "A" on the criterion for oil removal performance. Additionally, the fluorine concentration was 1.02 µg/cm$^2$. "KY130" is a metaxylene hexafluoride solution of a perfluoropolyether group-containing silane, having a solid content of 20 mass % and having a probable structure of general formula [3]. The results are shown in Table 1.

Example 7

The procedure of Example 3 was repeated with the exception that KY130 was used as the perfluoropolyether group-containing silane, thereby obtaining a sample having a cured condensed coating film. The thus obtained antifouling article was rated "A" on the criterion for dust adhesion, "A" on the criterion for dust removal performance and "A" on the criterion for oil removal performance. Additionally, the fluorine concentration was 1.14 µg/cm$^2$. The results are shown in Table 1.

Example 8

The procedure of Example 4 was repeated with the exception that Dow 2634 Coating was used as the perfluoropolyether group-containing silane, thereby obtaining a sample having a cured condensed coating film. The thus obtained antifouling article was rated "A" on the criterion for dust adhesion, "A" on the criterion for dust removal performance and "A" on the criterion for oil removal performance. Additionally, the fluorine concentration was 1.22 µg/cm$^2$. The results are shown in Table 1. "Dow 2634 Coating" is a mixture solution of a perfluoropolyether group-containing silane, ethylperfluorobutylether and ethylperfluoroisobutylether, available from Dow Corning Toray Co., Ltd., having a solid content of 20 mass % and having a probable structure of general formula [4]. The results are shown in Table 1.

Comparative Example 1

The procedure of Example 1 was repeated with the exception that application was achieved only by employing Mayer bar method as an application method and then successively shifted to the drying step, thereby obtaining a sample having a cured condensed coating film. The thus obtained antifouling article was rated "B" on the criterion for dust adhesion, "A" on the criterion for dust removal performance and "B" on the criterion for oil removal performance. Additionally, the fluorine concentration was 2.12 µg/cm$^2$. The results are shown in Table 1.

Comparative Example 2

The procedure of Example 1 was repeated with the exception that application was achieved only by employing spin coating as an application method and then successively shifted to the drying step, thereby obtaining a sample having a cured condensed coating film.

The thus obtained antifouling article was rated "B" on the criterion for dust adhesion, "A" on the criterion for dust removal performance and "B" on the criterion for oil removal performance.

Additionally, the fluorine concentration was 2.32 μg/cm². The results are shown in Table 1.

Comparative Example 3

The procedure of Example 1 was repeated with the exception that application was achieved only by employing dip coating as an application method and then successively shifted to the drying step, thereby obtaining a sample having a cured condensed coating film. The thus obtained antifouling article was rated "B" on the criterion for dust adhesion, "A" on the criterion for dust removal performance and "B" on the criterion for oil removal performance. Additionally, the fluorine concentration was 2.21 μg/cm². The results are shown in Table 1.

Comparative Example 4

The procedure of Example 1 was repeated with the exception that application was achieved only by employing curtain flow coating as an application method and then successively shifted to the drying step, thereby obtaining a sample having a cured condensed coating film. The thus obtained antifouling article was rated "B" on the criterion for dust adhesion, "A" on the criterion for dust removal performance and "B" on the criterion for oil removal performance. Additionally, the fluorine concentration was 2.35 μg/cm². The results are shown in Table 1.

Comparative Example 5

The procedure of Comparative Example 2 was repeated with the exception that KY130 was used as the perfluoropolyether group-containing silane, thereby obtaining a sample having a cured condensed coating film. The thus obtained antifouling article was rated "B" on the criterion for dust adhesion, "A" on the criterion for dust removal performance and "C" on the criterion for oil removal performance. Additionally, the fluorine concentration was 2.49 μg/cm². The results are shown in Table 1.

INDUSTRIAL APPLICABILITY

The antifouling article of the present invention exhibits an excellent antifouling property in indoor environment such as living space, kitchen, water-related space, vestibule, bathroom, toilet and the like, outdoor environment with many dust particles and a housed environment such as in a bag or a cloth pocket. Additionally, the excellent antifouling property is exhibited even in an environment where oily pollutants (i.e., stains due to sebum such as fingerprints, edible oil and cosmetics) are sometimes lowered when the fine substances heavily adhere to the coating film. More specifically, the excellent antifouling property can be imparted by using the antifouling article for architectural glass windows, doors, room partitions, tiles, table tops, wallpapers, showcases (for goods for sale, or for doll display), displays or touchscreen of electric or electronic equipment such as TV, cell phone, PC, ATM and digital photo frame, covers for lighting fixture, taps, mirrors, walls, cabinets, washbowls, counters, kitchen hoods, ventilating fans, stoves, thermal insulating cases used in convenience stores and the like.

EXPLANATION OF REFERENCE NUMERALS

1 Substrate
2 Member retaining a coating agent
3 Direction in which the coating agent is applied while bringing the member retaining the coating agent into contact with the substrate

The invention claimed is:

1. An antifouling article characterized by having a cured condensed coating film of a perfluoropolyether group-containing silane represented by the following general formula [1] on the surface of a substrate and by having a fluorine concentration of the cured condensed coating film of 0.2-2.0 μg/cm²

TABLE 1

|  | | Perfluoropolyether Group-Containing Silane | | Evaluation Result | | | |
|---|---|---|---|---|---|---|---|
|  | | | | | | Oil Removal Performance | |
|  | | | | Dust | | under Dust- | Fluorine |
|  | Application Method | Kind | Concentration (mass %) | Dust Adhesion | Removal Performance | Adhering Condition | Concentration (μg/cm²) |
| Example 1 | Preferable Hand Coating (90°) | OPTOOL DSX | 0.3 | A | A | A | 0.93 |
| Example 2 | Preferable Hand Coating (60°) | OPTOOL DSX | 0.3 | A | A | A | 0.94 |
| Example 3 | Preferable Hand Coating (45°) | OPTOOL DSX | 0.3 | A | A | A | 0.9 |
| Example 4 | Preferable Hand Coating (90°) | OPTOOL DSX | 0.2 | A | A | A | 0.85 |
| Example 5 | Preferable Hand Coating (90°) | OPTOOL DSX | 0.05 | A | A | A | 0.7 |
| Example 6 | Preferable Hand Coating (90°) | KY130 | 0.3 | A | A | A | 1.02 |
| Example 7 | Preferable Hand Coating (45°) | KY130 | 0.3 | A | A | A | 1.14 |
| Example 8 | Preferable Hand Coating (90°) | Dow 2634 Coating | 0.2 | A | A | A | 1.22 |
| Comparative Example 1 | Mayer Bar Method | OPTOOL DSX | 0.3 | B | A | B | 2.12 |
| Comparative Example 2 | Spin Coating | OPTOOL DSX | 0.3 | B | A | B | 2.32 |
| Comparative Example 3 | Dip Coating | OPTOOL DSX | 0.3 | B | A | B | 2.21 |
| Comparative Example 4 | Curtain Flow Coating | OPTOOL DSX | 0.3 | B | A | B | 2.35 |
| Comparative Example 5 | Spin Coating | KY130 | 0.3 | B | A | C | 2.49 |

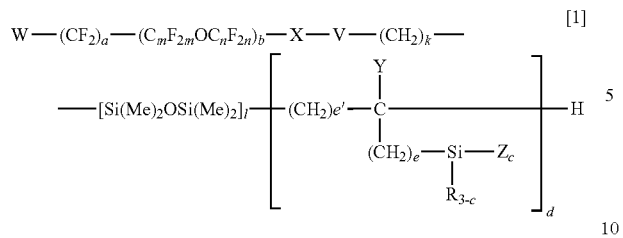  [1]

wherein "W" represents a fluorine atom or a substituent represented by the following structural formula:

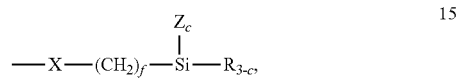

"Y" represents a hydrogen atom or a $C_1$-$C_5$ lower alkyl group,

"V" represents an oxygen atom or a divalent organic group wherein, in both the general formula [1] and the structural formula of "W", "X" represents a group represented by a formula $-(O)_g-(CF_2)_h-(CH_2)_i-(OC_2F_4)_j-$, wherein "g", "h", "i" and "j" mutually independently represent an integer of 0 to 50, the total of "g" and "h" is not smaller than 1, and the order of the positions of the parenthesized repeating units is arbitrary, "Z" represents at least one hydrolyzable functional group selected from the group consisting of alkoxyl groups such as methoxy group, ethoxy group, propoxy group, isopropoxy group, butoxy group and the like, chloro group, amino group and isocyanate group, "R" represents a $C_1$-$C_{10}$ alkyl group, and wherein "a" is an integer of 0 to 50, "b" is an integer of 1 to 200, "c" is an integer of 1 to 3, "d" is an integer of 1 to 10, "e" is an integer of 0 to 4, "e'" is an integer of 0 or 1, "f" is an integer of 0 to 5, "k" is an integer of 0 to 5, "l" is an integer of 0 or 1, "m" and "n" mutually independently represent an integer of 0 to 50, and the total of "m" and "n" is not smaller than 1.

2. A coating agent for forming a coating film, the agent being used for producing a cured condensed coating film formed on an antifouling article as claimed in claim 1, characterized in that the coating agent contains a perfluoropolyether group-containing silane represented by general formula [1].

* * * * *